INVENTOR.
ROBERT E. RAYMOND

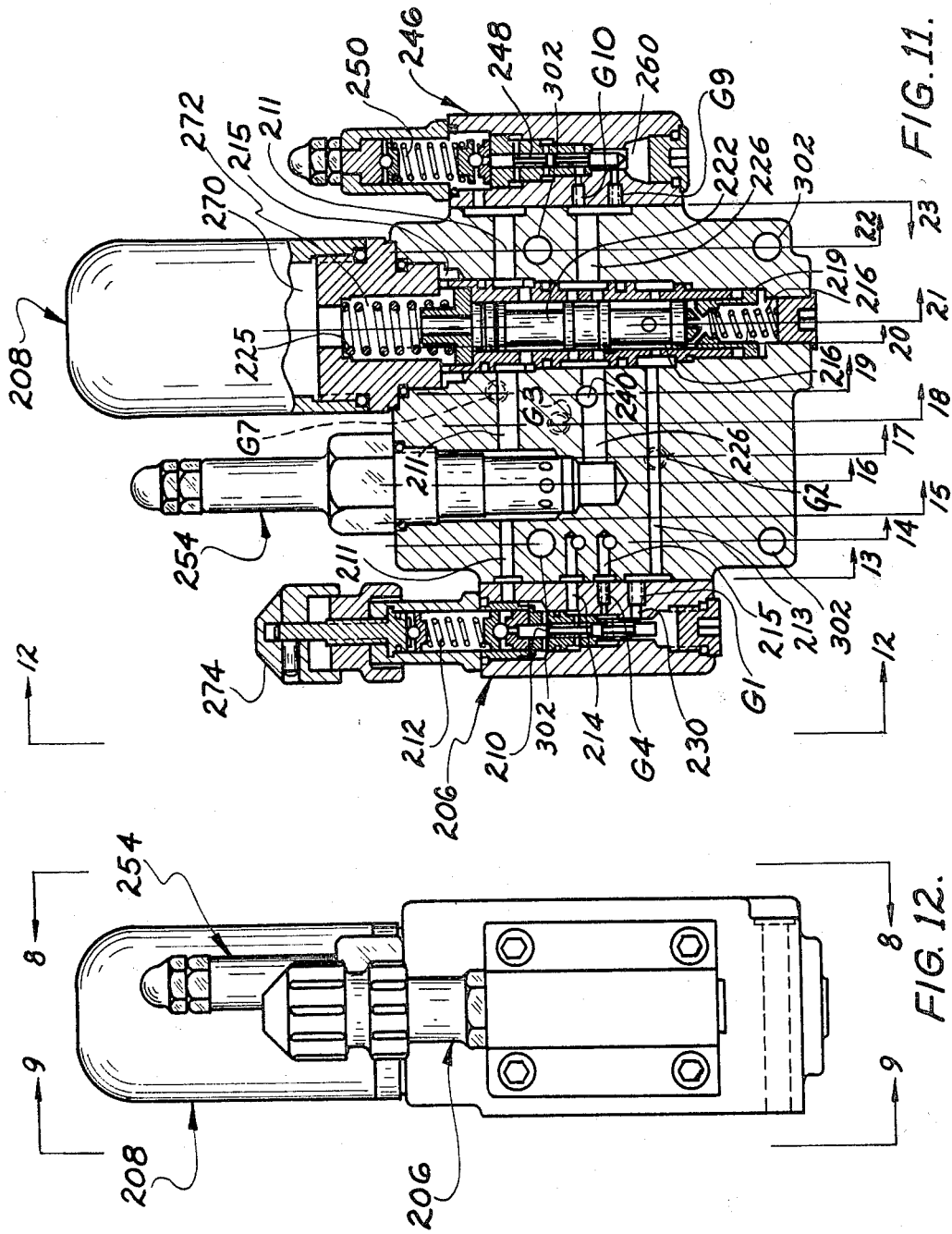

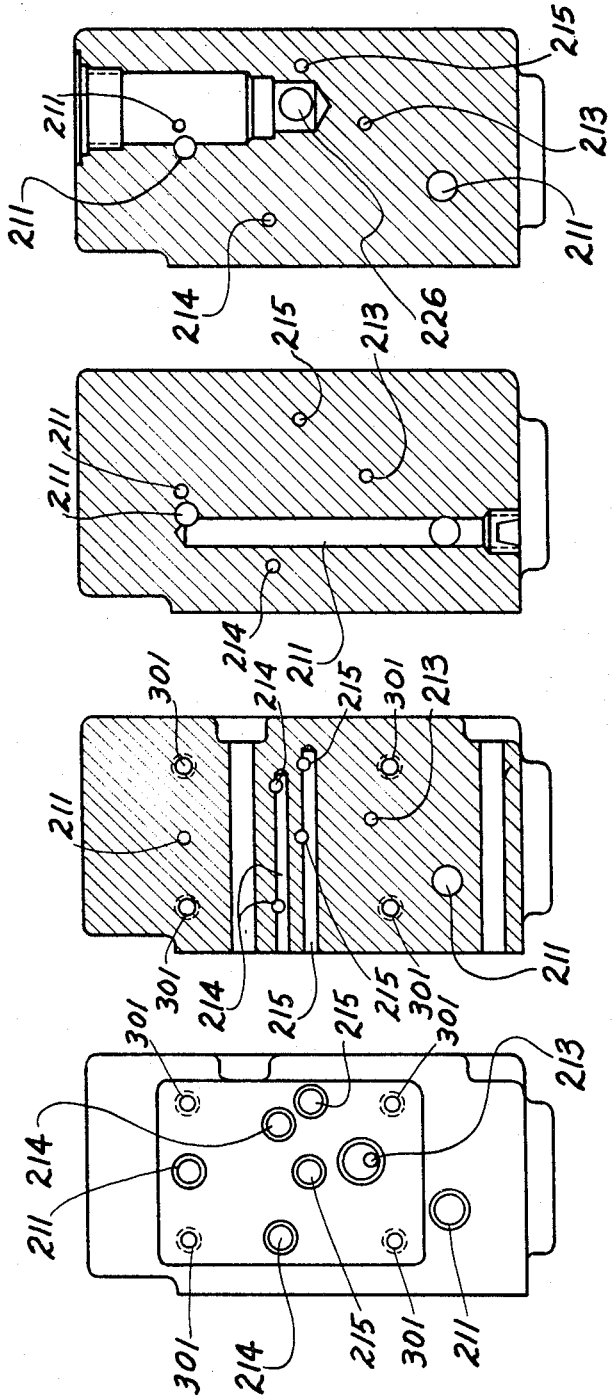

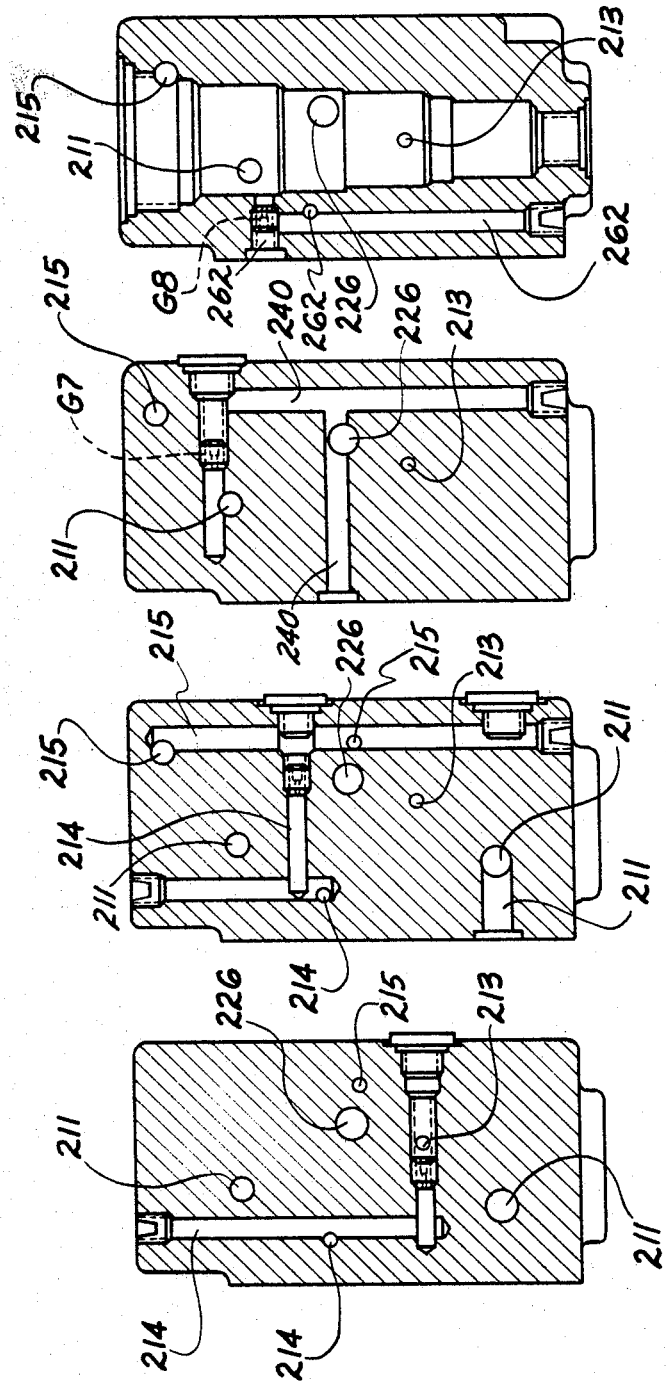

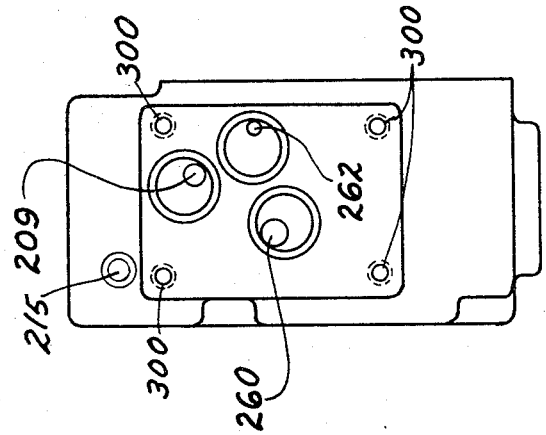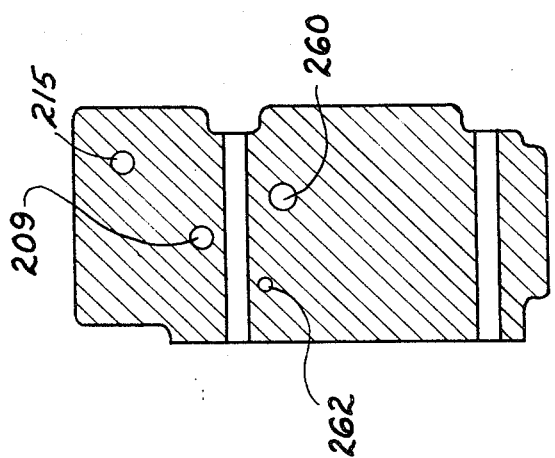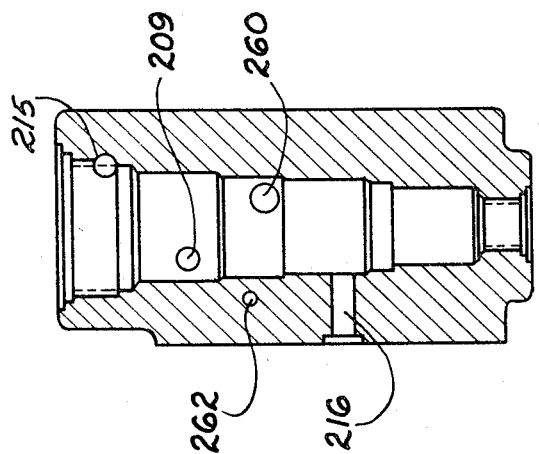

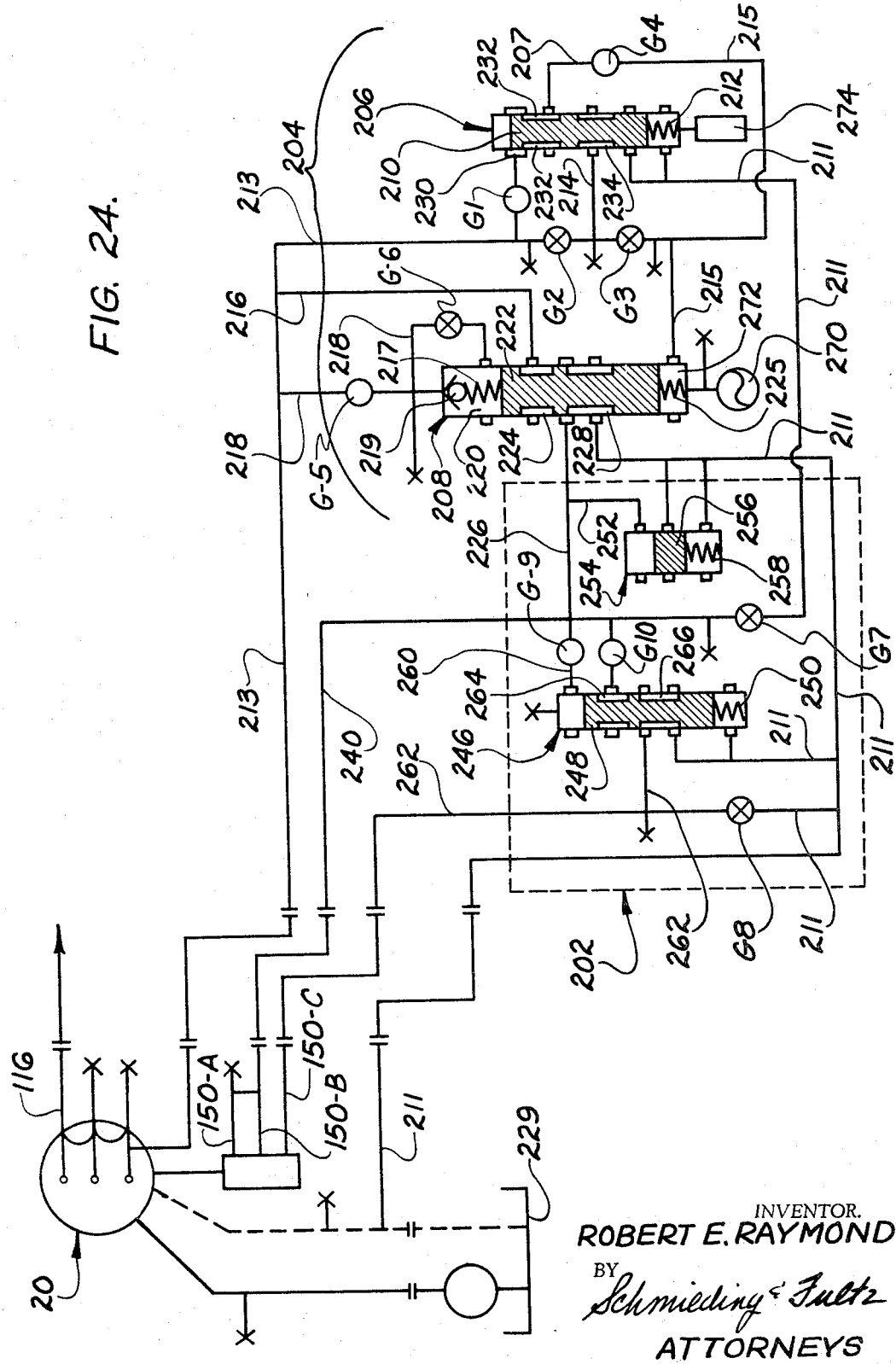

United States Patent Office 3,440,965
Patented Apr. 29, 1969

3,440,965
FLUID ACTUATED STROKE CONTROL SYSTEM FOR PLURAL PUMPS
Robert E. Raymond, Zanesville, Ohio, assignor to International Basic Economy Corporation, New York, N.Y.
Filed Dec. 29, 1966, Ser. No. 605,808
Int. Cl. F04b 49/00, 1/14, 21/00
U.S. Cl. 103—37                                    11 Claims

ABSTRACT OF THE DISCLOSURE

A fluid actuated stroke control system for plural pumps which includes a controller valve section that detects variations in pressure due to changes in conditions at a load and functions to operate a priority control valve means which in turn operates to sequentially control plural pumps.

---

The present invention relates generally to hydraulic pumping apparatus and particularly to a novel mutiple cartridge pumping apparatus provided with a unique variable displacement control apparatus.

In general, the hydraulic pumping apparatus of the present invention comprises a plurality of separate variable displacement pumping cartridges mounted in a common housing, such as disclosed in my co-pending application, now Patent No. 3,335,672 issued Aug. 15, 1967, which are uniquely controlled on a priority basis. This priority basis consists of selectively varying the displacement of the pumping pistons and hence the flow output of selected cartridges on a demand from a predetermined signal. In this manner, certain of the pumping cartridges are reduced to zero displacement before other cartridges are effected.

In conventional variable displacement operation, the pump is required to deliver a variable flow rate depending upon the fluid system demands at relatively constant pressure. The displacement of the pump is normally controlled by a regulator valve which acts to reduce or increase the flow output according to a demand signal to maintain a particular predetermined system pressure.

The conventional variable displacement pump operates as a single unit and the variable displacement means is usually responsive to a pressure control. When the pump is required to be at minimum displacement or "standby conditions," the internal horsepower losses are a function of the frictional and leakage characteristics within the pump and in general these horsepower losses remain relatively constant regardless of the displacement condition of the pump. Also all of the pumping elements are always under full pressure conditions and therefore full wear conditions regardless of the flow requirements.

In the pumping apparatus of the present invention, a plurality of novel separate pumping cartridges are uniquely mounted in a common housing and driven by a common drive shaft. These pumping cartridges are then controlled in a unique manner on a priority basis, that is, upon sufficiently reduced flow demands certain of the cartridges are forced to minimum displacement before one or more selected cartridges are effected and therefore the selected cartridges deliver all the required flow. If flow demands reduce further, then the unique priority control means automatically reduces the displacement of these selected cartridges until in the limit the minimum requirements of the fluid system are being supplied by the minimum number of cartridges.

During the minimum flow requirements, it can be readily understood that due to this construction, that the absolute optimum efficiency and lowest noise level is possible as the pumping cartridges which are not needed to supply flow are unloaded or moved to zero displacement and therefore are not under full pressure conditions.

In addition to reducing the noise level, the wear on the pumping elements is substantially reduced therefore longer life of these elements is obtained.

It is therefore an object of the present invention to provide a novel variable displacement pumping apparatus in which a plurality of unique separate pumping cartridges are mounted in a common housing and wherein the displacement of selected cartridges may be controlled in a unique manner on a priority basis.

It is another object of the present invention to provide a pumping apparatus of the type described in which a plurality of pumping cartridges are removably mounted in a common housing, each of the cartridges combining in one assembly, a cylinder barrel, pumping pistons, out-let valve mechanisms, and a piston return yoke means. With these basic components combined in a single cartridge type mechanism, they can be readily installed in a housing in multiples of any choice to provide a pumping apparatus of any desired flow capacity while maintaining a single standard pumping cartridge. Further, this standard cartridge is then available for replacement or repair in the most economical manner in any size pumping apparatus.

It is another object of the present invention to provide an apparatus of the type described which is readily adaptable to a variety of control applications to fit various situations present in the field.

It is another object of the present invention to provide a pumping apparatus of the type described which operates at the absolute optimum efficiency and lowest noise levels possible for a given size mechanism.

It is still another object of the present invention to provide a pumping apparatus of the type described which may be manufactured, fabricated, and serviced more economically than prior conventional variable displacement pumping apparatus.

Further objects and advantages of the present invention will be apparent from the following description, reference being had to the accompanying drawings wherein a preferred form of embodiment of the invention is clearly shown.

In the drawings:

FIG. 11 is a front elevational view partially in section of the apparatus shown in FIG. 8, the section being taken along line 11—11 in FIG. 10.

FIG. 12 is a left end elevational view of the apparatus shown in FIG. 8.

FIG. 13 is an end sectional view of the apparatus shown in FIG. 8, the section being taken along line 9—9 in FIG. 8.

FIG. 14 is an end sectional view of the apparatus shown in FIG. 8, the section being taken along line 10—10 in FIG. 8.

FIG. 15 is an end sectional view of the apparatus shown in FIG. 8, the section being taken along line 11—11 in FIG. 8.

FIG. 16 is an end sectional view of the apparatus shown in FIG. 8, the section being taken along line 12—12 in FIG. 8.

FIG. 17 is an end sectional view of the apparatus shown in FIG. 8, the section being taken along line 13—13 in FIG. 8.

FIG. 18 is an end sectional view of the apparatus shown in FIG. 8, the section being taken along line 14—14 in FIG. 8.

FIG. 19 is an end sectional view of the apparatus shown in FIG. 8, the section being taken along line 15—15 in FIG. 8.

FIG. 20 is an end sectional view of the apparatus shown in FIG. 8, the section being taken along line 16—16 in FIG. 8.

FIG. 21 is an end sectional view of the apparatus shown in FIG. 8, the section being taken along line 17—17 in FIG. 8.

FIG. 22 is an end sectional view of the apparatus shown in FIG. 8, the section being taken along line 18—18 in FIG. 8.

FIG. 23 is an end sectional view of the apparatus shown in FIG. 8, the section being taken along line 19—19 in FIG. 8.

FIG. 24 is a diagrammatic view of a typical fluid circuit constructed in accordance with the present invention illustrating the unique priority displacement control means for a multiple cartridge pumping apparatus.

Figure 1:
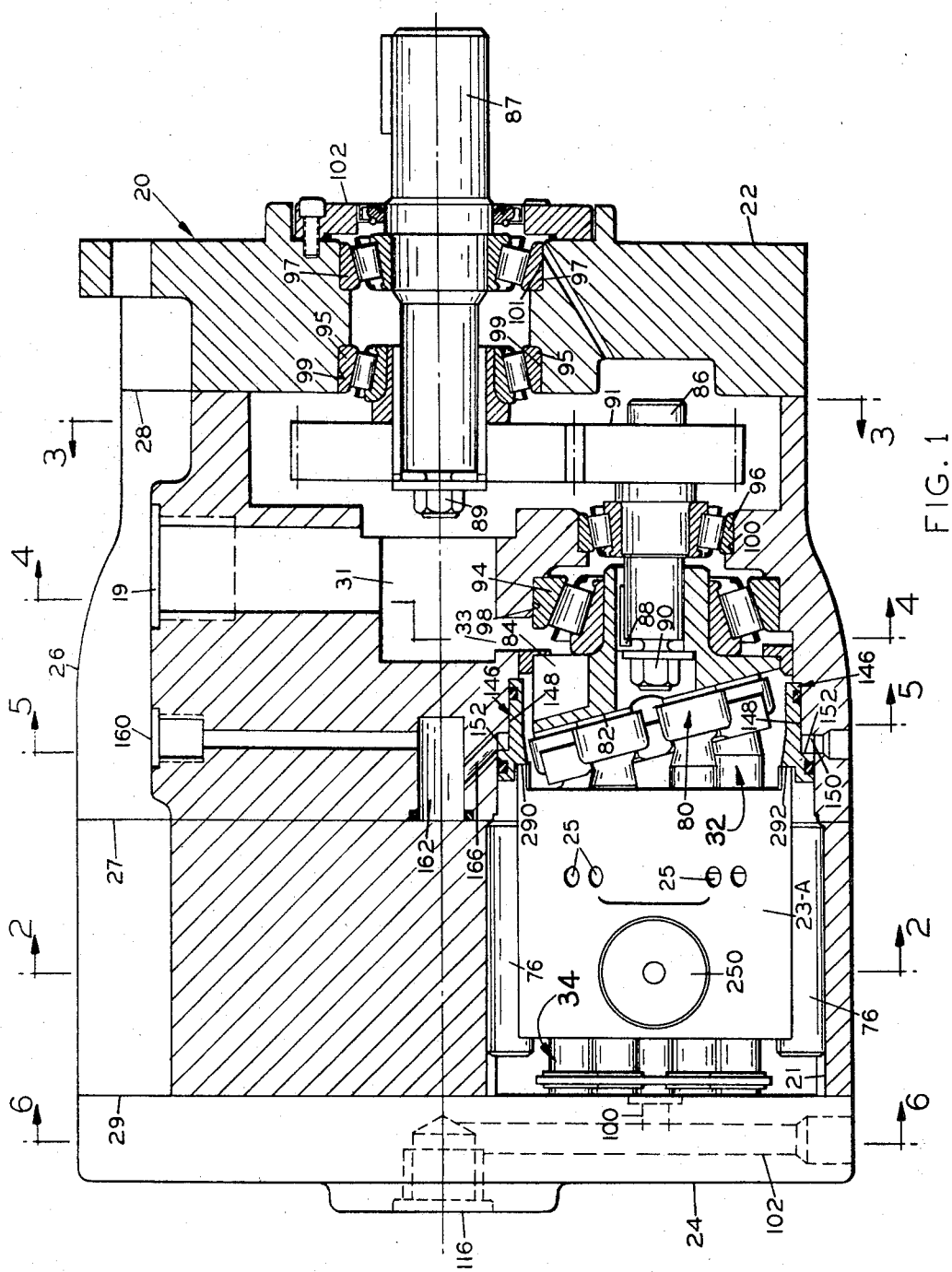
FIG. 1 is a side sectional view of multiple cartridge pumping apparatus constructed in accordance with the present invention, the section being taken on a plane through the centerline of the apparatus.

Referring in detail to the drawings, a multiple cartridge pumping apparatus is illustrated in FIG. 1 and is of substantially identical construction to the pumping apparatus described in my co-pending patent application, now Patent No. 3,335,672 issued Aug. 15, 1967. Therefore, in the interest of brevity, it will only be described in general terms as a typical apparatus which forms a portion of the novel priority controlled variable displacement pumping apparatus of the present invention.

The axial piston type pump shown in FIG. 1 comprises a housing means, indicated generally at 20, which includes front and rear housing portions 22 and 24 removably joined to opposite ends of a middle housing portion 26 at interfaces 27, 28 and 29. Middle housing portion 26 may be divided into 2 portions along interface 27 for convenience in manufacture and fabrication if desired.

Housing means 20 includes a plurality of inner surfaces 21 that form chambers for receiving a plurality of standardized pumping mechanisms in the form of pumping cartridges indicated generally at 23-A, 23-B and 23-C.

One of said cartridges 23 is exposed in the sectional cut away view of FIG. 1.

Figure 2:
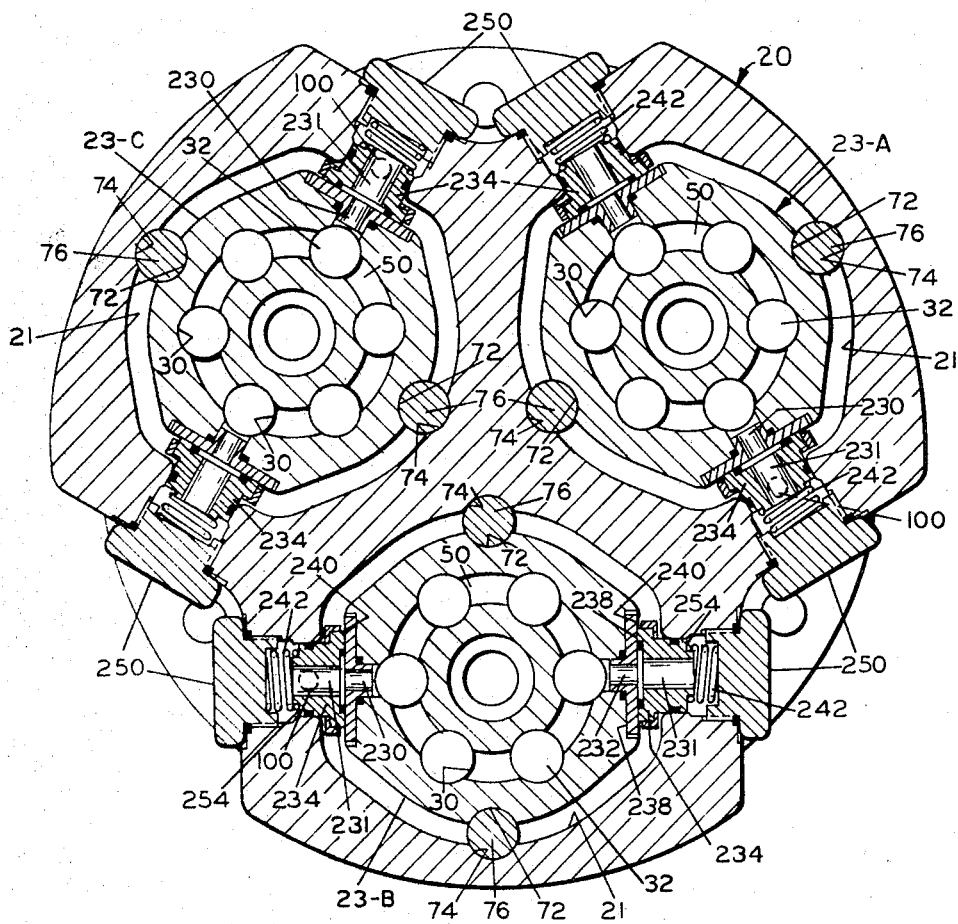
FIG. 2 is an end elevational view in section of the apparatus shown in FIG. 1, the section being taken along line 2—2 of FIG. 1.
Figure 7:
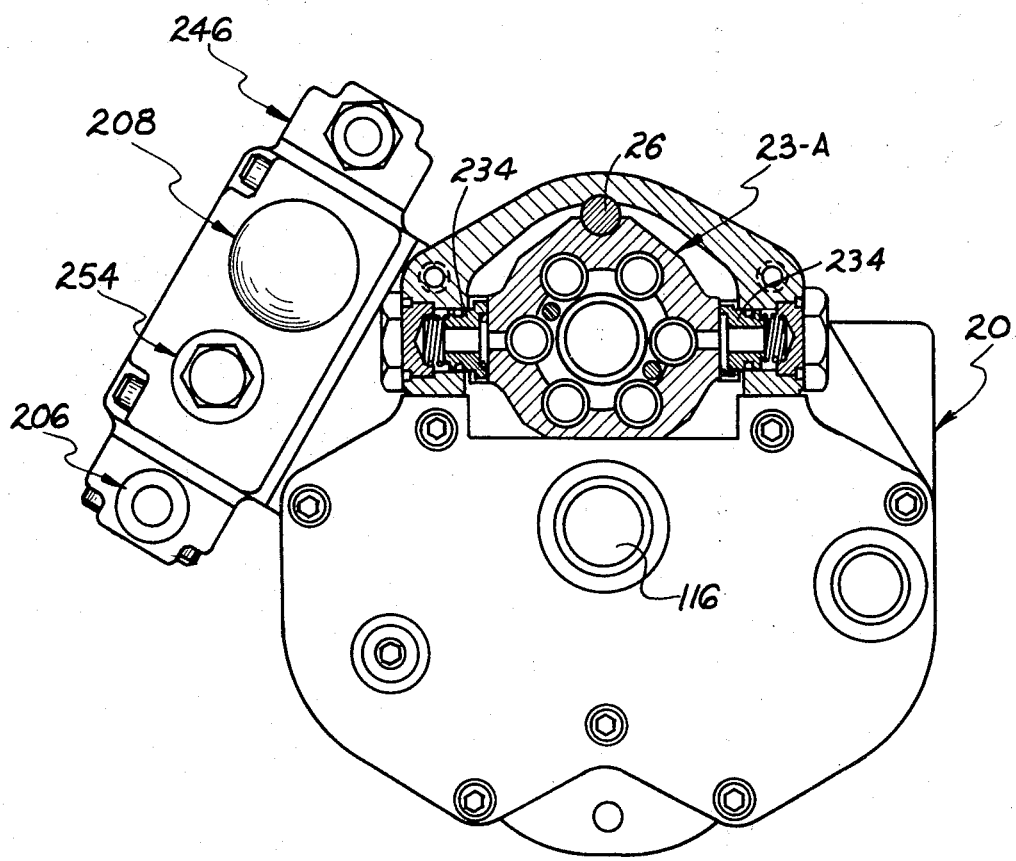
FIG. 7 is an end elevational view partially in section of the apparatus shown in FIG. 1 with the novel priority control means constructed in accordance with the present invention mounted thereon.
Figure 8:
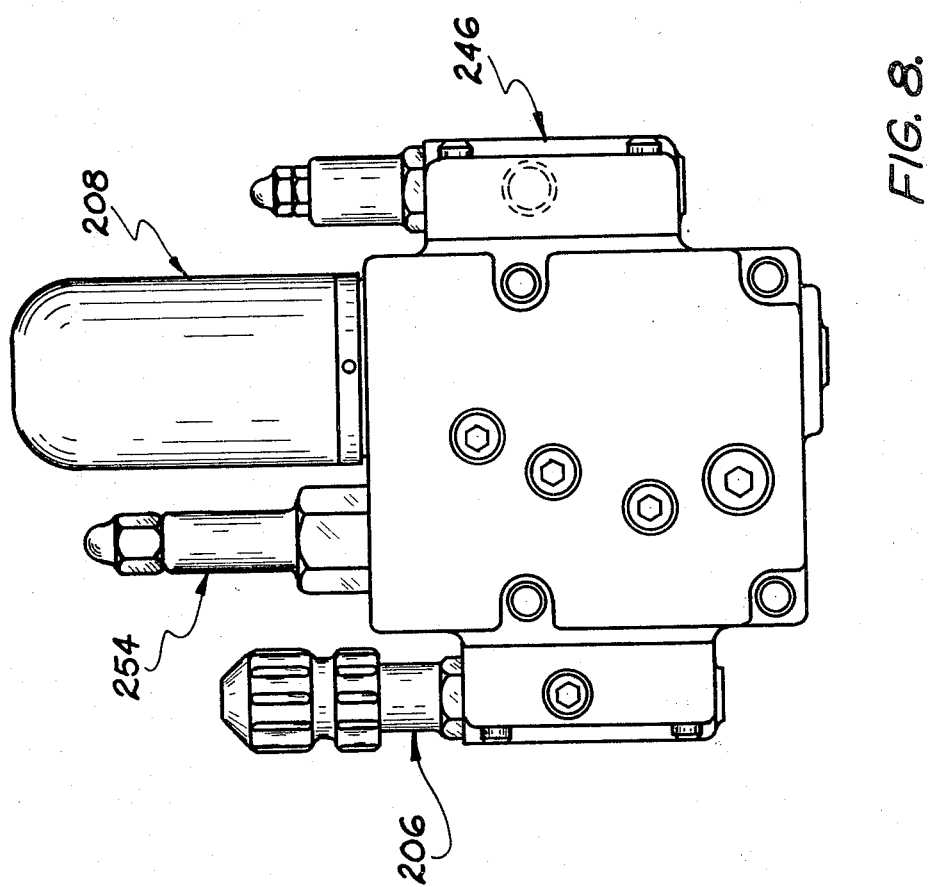
FIG. 8 is a front elevational view of a priority control apparatus of the present invention and an associated controller valve means shown in isolated relationship from the pumping apparatus.

As seen in FIGS. 1, 2 and 7 each pumping cartridge for example, cartridge 23-A is slideably and removably mounted in housing 20 by means of longitudinally extending side rail bearings 76. Each rail bearing 76 is mounted in guide grooves such as 72 and 74 and function not only to absorb piston side thrust reaction imposed on the cartridges 23-A but, in addition, function as keys against cylinder barrel rotation and thereby serve to absorb torque.

Rail bearings 76 are preferably formed from standard steel dowel pins.

Still referring to FIGS. 1, 2, and 7, the standardized cartridges 23-A, 23-B, and 23-C each include a cylinder barrel provided with a plurality of open ended circumferentially spaced bores that form cylinders 30 which slideably receive a plurality of piston means indicated generally at 32.

In the embodiment shown and described herein, the pumping cartridges 23 are constructed in accordance with my co-pending application now Patent No. 3,335,672 issued Aug. 15, 1967, and are described in detail therein.

With reference to the present invention however, the type of cartridge 23-A, 23-B and 23-C could be modified in many ways, for example, the cartridge could be constructed as described in detail in my co-pending application now Patent No. 3,357,363 issued Dec. 12, 1967, as well as take other modified forms without departing from the spirit of the present invention.

Figure 4:
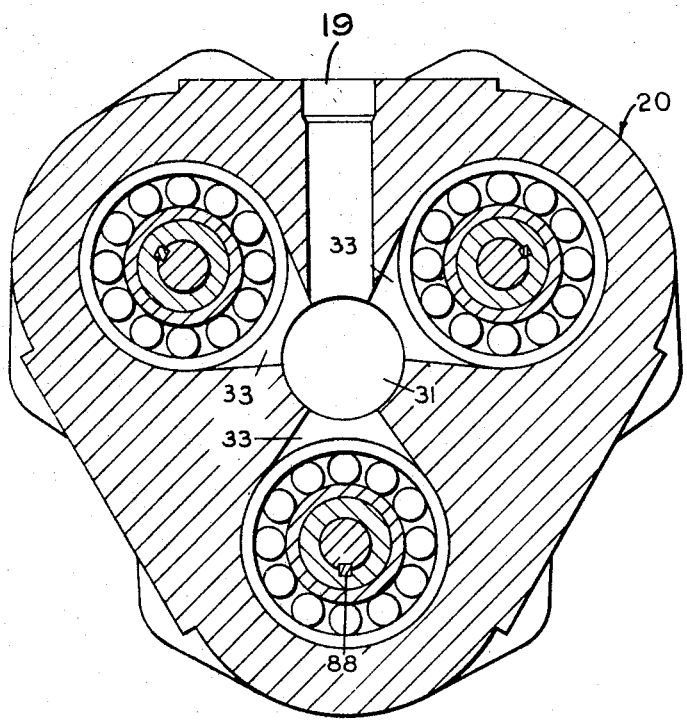
FIG. 4 is an end sectional elevational view of the apparatus shown in FIG. 1, the section being taken along line 4—4 in FIG. 1.

With reference to FIGS. 1 and 4, in the embodiment shown, cylinders 30 receive low pressure fluid via housing inlet port 19, central distributing chamber 31 and radial passages 33, FIG. 4, which communicate with each of the intake ports 25 in a respective cylinder 30.

Figure 6:
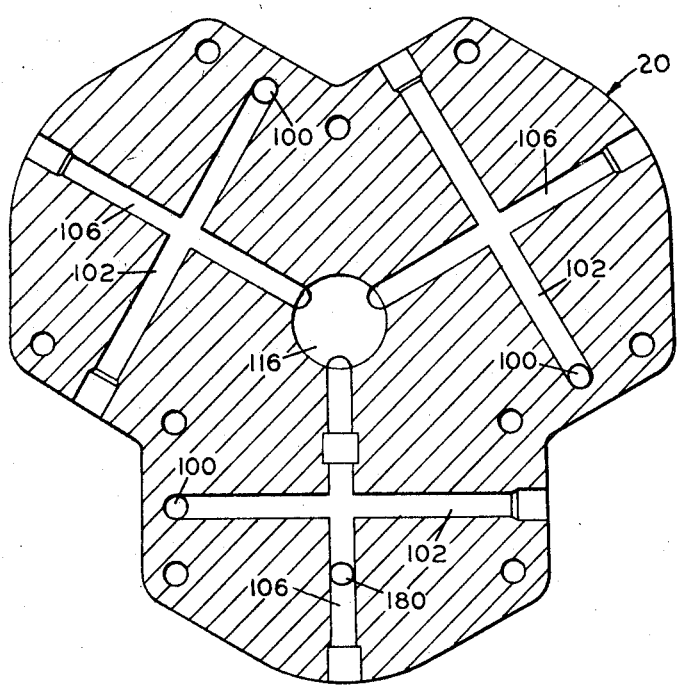
FIG. 6 is an end sectional elevational view of the apparatus shown in FIG. 1, the section being taken along line 6—6 in FIG. 1.

As seen in FIGS. 2 and 6, on the compression stroke pistons 32 deliver oil from cylinders 30.

The end of each cylinder 30 in a respective cartridge is closed by a reaction plug indicated generally at 34 that forms an outlet valve assembly.

Figure 3:
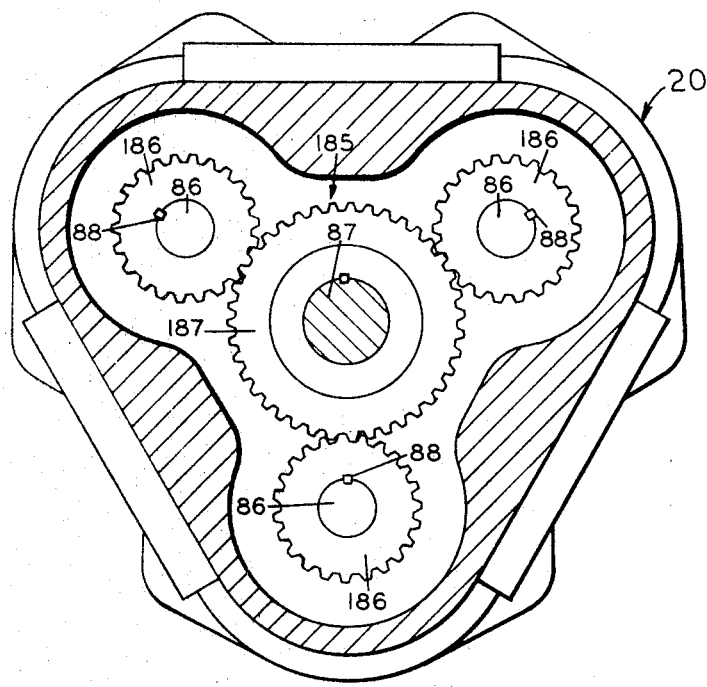
FIG. 3 is an end sectional elevational view of the apparatus shown in FIG. 1, the section being taken along line 3—3 of FIG. 1.

Referring to FIGS. 1 and 3, a cantilever mechanism drives the respective cam means indicated generally at 84, which includes an inclined face 82 in driving engaged with the respective pistons 32 in each pumping cartridge.

Each cam means 84 is keyed to a driven shaft 86 by a key 88, the cam means being retained on each shaft 86 by a nut 90.

Each shaft 86 is rotatably mounted in middle casing portion 26 by conventional tapered roller bearings 94 and 96 that are pressed into recesses 98 and 100, said bearings being disposed in back to back relationship.

Each driven shaft 86 is operatively connected to a main driving shaft 87 by a connecting link 91 which is retained on shaft 87 by a nut 89. Shaft 87 is rotatably mounted in front casing portion 22 by conventional tapered roller bearings 95 and 97 that are pressed into recesses 99 and 101. Bearings 95 and 97 are also disposed in back to back relationship. It should also be pointed out that the forward end of driving shaft 87 is provided with a wiper type seal assembly 102.

The operation of the multiple cartridge pump and the pumping cartridges are fully described in my previously mentioned co-pending applications and in the interest of brevity, the details will be omitted herein.

Since the main concern of the present invention is controlling variable displacement operation, the means in the embodiment shown for varying the displacement will be described next in detail although it will be understood that other forms of variable displacement means could be used without departing from the spirit of the present invention.

Figure 5:
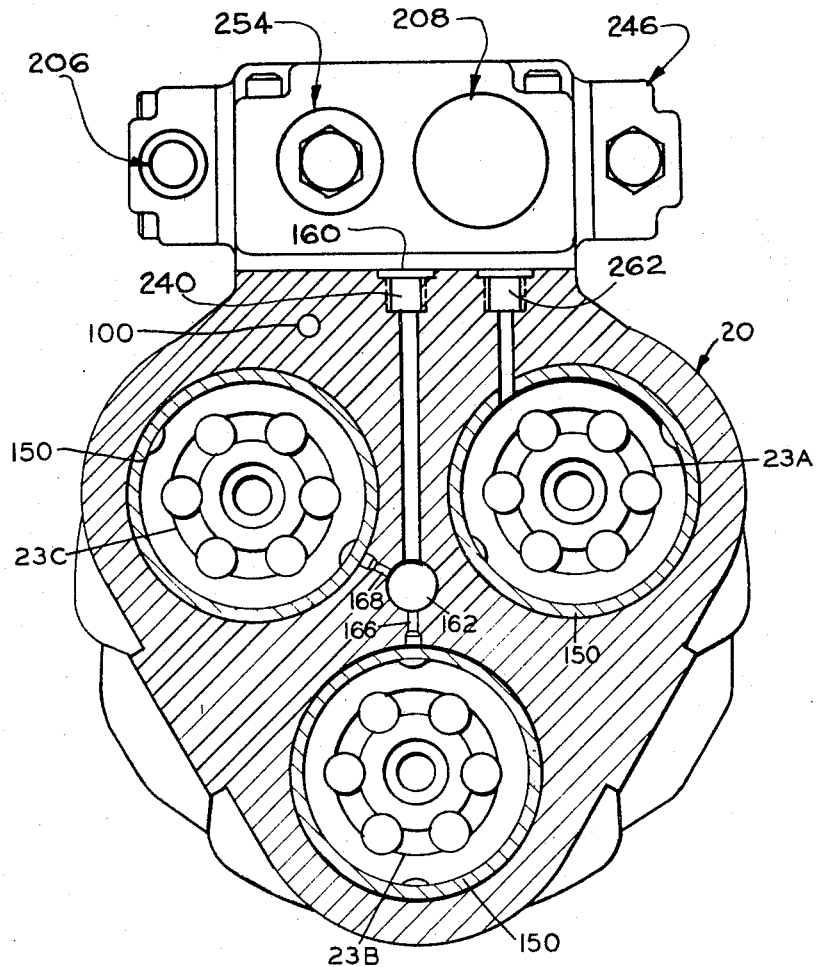
FIG. 5 is an end sectional elevational view of the apparatus shown in FIG. 1, the section being taken along line 5—5 in FIG. 1.

Now referring to FIGS. 1, and 5 as previously described each cartridge 23-A, 23-B, and 23-C in the variable displacement embodiment shown is constantly biased towards the front of the housing means by a compression spring, not shown, which also functions as a control spring furnishing the biasing force against which a respective cylinder barrel cartridge may be hydraulically shifted by means of a respective annular cylinder barrel cartridge driving piston 146, FIG. 1. Each piston 146 is mounted in a respective cylindrical surface 148 and forms therewith a control cylinder 150 for receiving pressurized oil in a manner later to be described. A small annular piston surface 152 of large diameter on each cartridge driving piston 146 provides sufficient axial force with relatively low control pressures to shift the cylinder barrel cartridges against the force of the compression springs disposed within each cartridge.

With reference to FIGS. 1 and 5, a main control port 160 communicates with a centrally disposed feedback chamber 162 which is connected to each control cylinder of the cartridges 23–B and 23–C through angularly drilled ports or passages 166 and 168.

Figure 9:
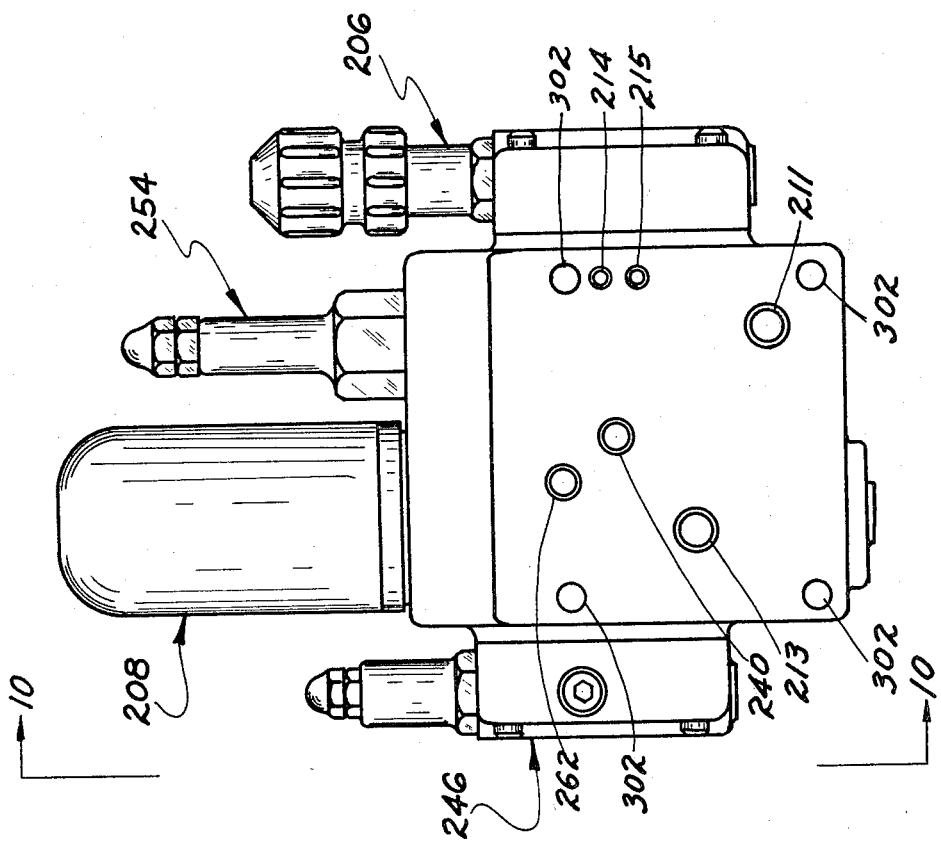
FIG. 9 is a rear elevational view of the control apparatus shown in FIG. 8.
Figure 10:
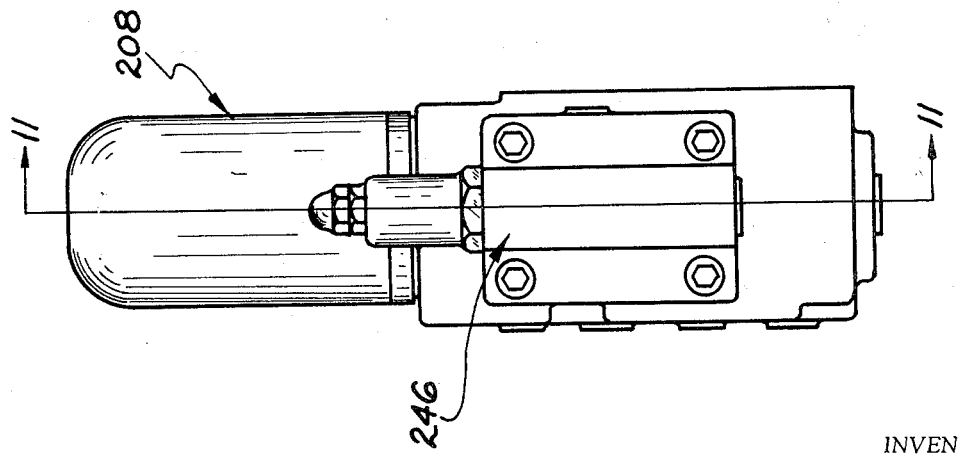
FIG. 10 is a right end elevational view of the control apparatus shown in FIG. 8.

Pressurized oil is conveyed to a priority pressure control governor, FIGS. 8 through 24, via passage 100 of cartridge 23–C. Such passage 100 acts as a pilot pressure line, from pressurized outlet flow in port 116, FIG. 6, to such priority control means 246. Passage 100 of cartridge 23–C in the pump housing connects with passage 213 of the control unit seen in FIG. 9, and also in the diagrammatic view of FIG. 24.

A preferred embodiment of a priority control pressure governor constructed in accordance with present invention is illustrated in FIGS. 8 through 23 and is mounted on housing 20 as seen in FIG. 7. However it is to be understood that such a control means could be located remote from housing 20 and could be connected in any conventional manner to the appropriate control ports without departing from the spirit of the present invention.

As best seen in FIG. 24 which is a diagrammatic view of the control means shown in FIGS. 8–23, a priority control means indicated generally at 202 receives a control flow of fluid from a controller valve means indicated generally at 204.

It should be pointed out that many general types of controllers could be used to deliver a control flow of fluid to priority control means 202 and could receive a predetermined signal, pressure or flow, for example, from a remote source, if desired without departing from the spirit of the present invention.

A preferred form of controller valve means 204 is shown herein and for simplicity of description, is shown receiving a pressure signal from the line 213 which communicates with multiple cartridge pump outlet port 116 and therefore is essentially at the same pressure.

Controller valve means 204 includes a detector element in the form of valve indicated generally at 206 and a power element in the form of valve indicated generally at 208. Passage or line 213 communicates with one end of valve spool 210 of valve 206 through an unrestricted orifice G1 and annular spool land 230. The pressure in line 213 being directed to pressure detector valve 206 and acting on the end of spool 210 creates a force which is opposed by spring 212. As pressure in line 213 rises spool 210 moves back proportionately against control spring 212. Line 213 is also connected to line 214 through an orifice G2 and as long as there is no flow through the valve 206 the pressure in lines 213 and 214 remain equal. As pressure in line 213 rises to a predetermined level, valve spool element 210 is displaced against spring 212 so that line 214 is communicated to line 211 by the action of the groove and throttling land 234 in the spool 210. At this point a flow begins to occur through valve 206 and therefore this flow causes a pressure drop across orifice G2. The pressure in line 214 is then lower than the pressure in line 213.

Orifice G3 is a dampening orifice and normally is not significant on a slow changing pressure basis so that line 214 and line 215 are essentially at the same pressure when the pressure in line 213 is changed slowly.

It should be pointed out that at a predetermined pressure, lower than that pressure which actuates spool 210 to open line 214 to line 211, a flow path from line 230 to line 207, via groove and throttling land 232, is opened. This permits rapid pressure rise at the lower end of spool 222 so that pressure in line 215 is essentially equal to pressure in line 213. During this operating condition spool 222 is not responsive to the rate of change of pressure in line 213. As pressure increases to move spool 210 to its control position it first closes groove and throttling land 232 and then opens groove and throttling land 234.

It should be mentioned that this novel control function of valve 206, just described, can be referred to as a "dual gain" control function and is described in detail in my co-pending application Ser. No. 605,724, filed Dec. 29, 1966.

Line 216 is at the same pressure as line 213 and such pressure in line 213 is communicated through orifices G5 and G6 in line 216 and reset check valve 219 and spring 217 into the upper chamber 220 of valve 208 such that the sensing of the pressure from line 213 is on the end of a valve spool 222 of the power element, valve 208. This means that the pressure drop across orifice G2 is essentially the same as the pressure difference across spool 222 of valve 208 on a slow rate of change operating basis.

As this pressure drop begins to increase, due to the flow through valve 206, which can be compared to a transducer and preamplifier combination, the increased pressure drop across G2 reflected across spool 222 begins to operate valve 208 by forcing spool 222 toward spring 225. The pressure in line 216 is then communicated to line 226 through groove and throttling land 224.

Therefore, as spool 222 is moved towards control spring 225, flow is directed from lines 213 and 216 to line 226. If spool 222 is directed in the opposite direction by the control spring 225, line 226 is communicated with line 209 by spool groove and throttling land 228. Lines 209 are essentially low pressure lines at tank or reservoir pressure as they lead to reservoir 229.

Essentially as pressure rises in the system at line 213, valve spool element 222 is moved to open line 216 to line 226 and as pressure drops in line 213, the pressure drop across orifice G2 is reduced to zero and spool element 222 is moved in the opposite direction by control spring 225 such that line 226 is communicating with line 209. This is therefore a three-way valve control action which is operating the priority control means 202.

Assuming that pressure in line 213 is rising such that valve element 222 opens line 216 to line 226 such that a control flow is delivered to line 226, this control flow proceeds through line 226 to line 240 and then through a restricting means in the form of restricted orifice G7 into line 211 which is a low pressure area.

As pressure builds up in line 226 due to increasing control flow entering restricted orifice G7, the pressure is reflected via line 240 to two of the control cylinders 150 which function as standby control cylinders. These are indicated as 150–B and 150–C for cartridges 23–B and 23–C as seen in FIG. 24. In addition, the pressure is reflected through a passage 260 to a shielding or priority control valve indicated generally at 246 and is present at the upper face of a spool 248 which is opposed by a spring 250.

The pressure in line 226 is also communicated to a line 252 to a control pressure relief valve indicated generally at 254 and is measured by the action of the pressure on a spool 256 opposed by a spring 258.

As the control flow in line 226 increases and is converted into a control pressure by orifice G7, the control pressure rises in line 240 and the two standby cartridges 23–B and 23–C of pump 20 are moved in the direction of zero displacement on a basis proportional to the control flow entering line 226. This is made possible by the action of the flow through restricted orifice C7 which makes an increased control flow necessary to generate a progressively higher pressure in the priority control means. As the system flow demands from outlet port 116 reduce and valve 208 is forced clear open, more control flow enters line 226 until the pressure in line 240 is high enough to have forced the two standby cartridges 23–B and 23–C to zero displacement. Any increase in pressure then operates spool 248 against spring 250 to permit flow to occur from line 226 and 240 through orifice G10 and then into line 262, through spool groove and throttling land 264.

Line 262 communicates with the control cylinder 150–A for the "holding cartridge" 23–A and also through restricted orifice G8 to the low pressure area, line 209, responsive to the increase in control pressure above a predetermined level necessary to open valve 246. An increase control flow through valve 246 then permits an increased control flow to enter restricted orifice G8 thereby building up the control pressure which is communicated to the control cylinder 150–A. The holding cartridge 23–A then is progressively reduced in its displacement upon a continued rise in control pressure in line 262 until it reaches a minimum displacement condition which is determined by the net flow requirements of both the system and the control flows which have been generated in the control circuit itself. In this condition the pump is operating at its minimum power, noise, and wear conditions for that particular system. In summarizing, pressure in the line 213 is monitored by valves 206 and 208 which in turn are supplying the control flow signal into line 226 which in turn is controlled by the priority control elements to maintain the control pressure on the control cylinders of the cartridges 23–A, 23–B, and 23–C in the proper relation.

Now as the pressure in line 213 drops to the fact that conditions of the load to which outlet 116 is feeding flow have changed and more flow is required, valve 206 acts to close line 211 to 214 as the valve spool 210 moves responsive to spring 212 thereby reducing the pressure drop across orifice G2 which in turn reduces the pressure drop across the spool 222. Spool 222 then is forced towards a closed position by the bias spring 225. This movement of spool 222 in turn reduces the flow from line 216 to line 226 through groove and throttling spool land 224. This reduced flow into line 226 then reflects a drop in pressure in lines 226, 240, 260, and valve 246 acts to close responsive to the bias spring 250. This acts to close groove and throttling land 264 which in turn reduces the flow through orifice G8 and correspondingly reduces the control pressure in line 262. Therefore the holding cartridge 23–A begins to develop more pump flow as it is moved to a higher displacement level.

As the control flow to orifice G7 continues to reduce, valve 246 will completely reverse communicating line 262 with line 209 through orifice G8 by the groove and throttling land 266 in valve spool element 248. Orifice G8 is by-passed as line 262 is communicated directly to line 209 through groove and throttling land 266. The control pressure in line 262 then completely drops to the low pressure level of line 209 and the holding cartridge 23–A is at full displacement.

At some predetermined pressure, for example 400 p.s.i., valve spool element 248 will move to the above described closed position wherein no control flow occurs from line 226 to line 262. At this point the fluid system is requiring the full capacity of the one holding cartridge 23–A, but has not necessarily demanded pump flow from cartridges 23–B and 23–C in pump 20.

Pressure in line 226 is still at the predetrmined pressure of 400 p.s.i. and the two cartridges 23–B and 23–C are still at minimum displacement. If the load further increases its flow demands, pressure in line 226 will drop lower as the control flow into line 226 is further reduced and therefore pressure in line 240 is lowered and both of the standby cartridges 23–B and 23–C operated by the respective control pistons and cylinders begin to pump flow into the main pressure line. As the control flow into line 226 continues to reduce, the pressure through the restricted orifice G7 cannot be maintained.

In the limit, when the control pressure is reduced to a point signaling full pump flow, the pressure in line 226 will be reduced to zero or to the low pressure of lines 209 by the reversing action of spool 222 which communicates line 226 to line 209 directly through the spool groove and throttling land 228. This is the sequential manner in which the valve proceeds through its control history on a slow rate of change basis.

In the system shown, controller valve means 204 is provided with unique features which become important during a rapid pressure change situation or in a high frequency sense.

First, if pressure rises in line 213, it is communicated to the upper side of spool 222 in valve 208 through orifice G5 and reset check valve 219 without much restriction. Conversely, flow is restricted considerably more through restricted orifice G3 and line 215 into the lower side of spool 222.

A resilient means or capacitive element, in the form of an oil volume, in a chamber 270 is connected to lower chamber 272 of valve 208. During rapid pressure changes, the pressure in chamber 270 cannot be raised quickly through line 215 because of restricted orifice path through G2 or G3. This means that the spool element 222 will move downwardly as seen in FIG. 24 as if it were a solid column of oil to try to bring the pressure in the fluid chamber 270 up to the level that is present in the system. This action effectively means that the spool 222 is responsive to the rate of change of pressure in the system in a direction to relieve the pressure in the system by communicating line 216 to line 226 if the spool element moves significantly. On the other hand, pressures generated from the action of valve 206 are not communicated directly to the spool 222 because of the high damping of restricted orifice G3.

In essence pressure in line 214 is due to the action of spool 210 which may resonate or move at rather high frequency. However this pressure is not communicated on a high frequency or rapid rate of change basis to chamber 270. This represents essentially an RC or resistance-capacitance filter network in lines 214 and 215 which means that the spool 222 will not be responsive in a high frequency sense to valve 206 but will be responsive in a slow rate of change or low frequency sense. As the pressure in the system rises quickly, then line 216 can be communicated to line 226 by the derivitive action of moving the spool 222 into capacitance 270. On the other hand, as the pressure in the line 213 drops, spool 222 cannot be returned instantly because of the throttling action brought on by the reset check valve 219 responsive to spring 217 which closes. This restricts reverse movement of spool 222 and forces the reverse flow to occur through restricted orifice G6 and subsequently through orifice G5 in series. This means that spool 222 is slower in its rate of resetting or closing as compared to its rate of opening action. This helps reduce shock and overshoot in a fast closing valve but has the stiff dampening characteristic of not permitting the spool to go into a chatter or high frequency vibration.

This is how the controlled valve illustrated herein operates. As far as the priority control means 202 is concerned, the effects at high frequency may be described as follows.

If flow is directed into line 226 from any pressure controller in general which has overshot due to, for example, a sudden pressure change in line 213 and permits control flow to enter line 226, then pressure in the priority control system is forced to rise because the control mechanism of pump 20 cannot move quickly enough. Then the pressure control relief valve 254 acts to receive this flow through line 252 and divert it to line 209 by the action of the spool 256 opposed by relief valve spring 258. The excess energy injected into the control system is therefore diverted by relief valve 254.

Therefore it can be readily seen that priority control means 202 can operate from many different types of controller valve means 204. The controller valve means 204 is merely a specific example of a preferred embodiment and has unique features of its own that are desirable but not necessary to the operation of the priority control means 202.

The operation of the priority control of the multiple cartridge pump was described with reference to diagrammatic view of FIG. 24, and the various elements, passages or lines and orifices are numbered correspondingly in FIGS. 9 through 24.

It is important to point out that although the present invention was described with reference to a tri-cartridge pump, other multiples could be used as well as other modifications of the control porting or of the priority selection of cartridges to be controlled without departing from the spirit of the present invention.

Further, it should be understood that the unique priority control technique could be used to control separate variable displacement pumping mechanisms which are not mounted in a common housing.

I claim:

1. In a hydraulic pumping apparatus the combination of a plurality of separate pumping mechanism each of said mechanisms including a plurality of cylinders, a plurality of pumping pistons mounted for reciprocation in said cylinders, and pressure responsive variable displacement actuating means for varying the displacement of said pumping pistons in said cylinders, each of said displacement actuating means including an inlet; controller valve means including an inlet for receiving a predetermined signal from said pumping apparatus and an outlet for delivering a control flow fluid; and priority control means including an inlet for receiving said control flow and means for converting said control flow into a control pressure and for sequentially allocating said control pressure to said inlets of said variable displacement actuating means of said pumping mechanisms.

2. The apparatus defined in claim 1 wherein said priority control means includes a priority control valve including an inlet and an outlet; first passage means communicating with said control flow; second passage means communicating with said first passage means, said priority valve inlet and with one of said variable displacement means in one of said pumping mechanisms; flow restricting means disposed in said second passage means for converting said control flow into a control pressure; third passage means communicating with said priority control valve outlet and with other of said variable displacement actuating means in other of said pumping mechanisms; said priority control valve means being responsive to a predetemined control pressure to communicate said second passage means with said third passage means to permit said control pressure to communicate with said other variable displacement actuating means.

3. In a hydraulic machine the combination of a housing including a housing inlet and housing outlet port; a plurality of separate pumping cartridges disposed within said housing, each of said cartridges including a cylinder barrel provided with a plurality of cylinders, a plurality of pistons mounted for reciprocation in said cylinders and a displacement control cylinder and piston for varying the displacement of said pistons in said cylinders, each of said displacement control cylinders including an inlet; first and second control passages in said housing, said first control passage communicating with an inlet of one of said displacement control cylinders and said second control passage communicating with an inlet of another of said displacement control cylinders; controller valve means including an inlet for receiving a predetermined signal from said pumping apparatus and an outlet for delivering a control flow of fluid; and priority control means including an inlet for receiving said control flow and means for converting said control flow into a control pressure and for sequentially allocating said control pressure to said first and second control passages.

4. The apparatus defined in claim 3 wherein said priority control means includes a restricting means responsive to an increase or decrease in said control flow and a priority valve means which opens or closes upon a predetermined pressure signal from said restricting means.

5. The apparatus defined in claim 3 wherein said priority control means includes relief valve means communicating with said control flow and responsive to a predetermined pressure to divert excess control flow from said controller valve means.

6. The apparatus defined in claim 3 wherein said priority control means includes a priority control valve including an inlet and an outlet; first passage means communicating with said control flow; second passage means communicating with said first passage means, said priority valve inlet and with one of said variable displacement control cylinders in certain of said pumping mechanisms; flow restricting means disposed in said second passage means for converting said control flow into a control pressure; third passage means communicating with said priority control valve outlet and with other of said variable displacement control cylinders in other of said pumping mechanisms; said priority control valve means responsive to a predetermined control pressure to communicate said second passage means with said third passage means to permit said control pressure to communicate with said other variable displacement control cylinders.

7. In a hydraulic machine the combination of a plurality of pumping cartridges disposed in a common housing, each of said cartridges including a plurality of axially disposed cylinders, a plurality of pistons mounted for reciprocation within said cylinders, and pressure responsive actuating means for varying the displacement of said pistons in said cylinders, each of said pressure responsive means including an inlet; controller valve means including an inlet for receiving a predetermined signal from said pumping apparatus and an outlet for delivering a control flow of fluid; priority control means including an inlet for receiving said control flow and for sequentially allocating said control flow to an inlet of one of said pressure responsive actuating means for certain of said pumping cartridges before allocating said control pressure to an inlet of another of said pressure responsive actuating means in certain other of said pumping cartridges; and a common drive shaft rotatably mounted in said housing and operatively connected to each of said pumping cartridges.

8. In a hydraulic pumping apparatus the combination of a housing including a housing inlet and a housing outlet port; a plurality of separate pumping cartridges removably mounted within said housing, each of said mechanisms including a plurality of axially disposed cylinders, a plurality of pumping pistons mounted for reciprocation in said cylinders, and pressure responsive variable displacement actuating means for varying the displacement of said pumping pistons in said cylinders, each of said displacement actuating means including an inlet; controller valve means including an inlet for receiving a predetermined signal from said pumping apparatus and an outlet for delivering a control flow of fluid; priority control means including an inlet for receiving said control flow and means for converting said control flow into a control pressure and sequentially allocating said control pressure to each of said variable displacement means; and passage means in said housing for collecting the outlet flow from all of said pumping cartridges.

9. In a hydraulic pumping apparatus the combination of a housing forming a chamber and including housing inlet and outlet ports; a plurality of pumping cartridges removably mounted in said housing, each of said pumping cartridges including a plurality of cylinders, a plurality of pistons mounted for reciprocation in said cylinders, and an axially extending side wall provided with cartridge inlet and cartridge outlet ports; means for connecting said cartridge outlet ports with said housing outlet port; pressure responsive variable displacement actuating means mounted in said housing for varying the displacement of said pistons in said cylinders of a respective one of said cartridges, each of said displacement actuating means including an inlet; drive shaft means rotatably mounted in said housing and operatively connected to each of said pumping cartridges; controller valve means including an inlet for receiving a predetermined signal from said pumping apparatus and an outlet for delivering a control flow; and priority control means including an inlet for receiving said control flow and means for converting said control flow into a control pressure and selectively allocating said control pressure to said pressure responsive variable displacement actuating means.

10. The apparatus defined in claim 9 wherein said priority control means includes a priority control valve including an inlet and an outlet; first passage means communicating with said control flow; second passage means communicating with said first passage means, said priority valve outlet and with one of said variable displacement actuating means in one of said pumping mechanisms; flow restricting means disposed in said second passage means for converting said control flow into a control pressure; third passage means communicating with said priority control valve outlet and with other of said variable displacement actuating means in other of said pumping mechanisms; said priority control valve means being responsive to a predetermined control pressure to communicate said second passage means with said third passage means to permit said control pressure to communicate with said other variable displacement actuating means.

11. In a hydraulic pumping apparatus the combination of a housing including a plurality of chambers, housing inlet and outlet ports; a plurality of pumping cartridges disposed in said chambers, each of said cartridges including a slideably mounted cylinder barrel provided with a plurality of cylinders, an annular manifold, a plurality of pistons disposed in said cylinders and cartridge inlet ports; a plurality of driven shaft means, each including a cam engaging said pistons in a respective one of said cartridges; means for conducting fluid from said manifolds to said housing outlet port; pressure responsive actuating means for each of said cartridges for shifting each of said cylinder barrels, each of said actuating means including an inlet; drive shaft means in driving engagement with said driven shaft means; controller valve means including an inlet for receiving a predetermined signal from said pumping apparatus and an outlet for delivering a control flow fluid; and priority control means including an inlet for receiving said control flow and means for converting said control flow into a control pressure proportional to said control flow and for selectively allocating said control pressure to certain of said pressure responsive actuating means.

References Cited
UNITED STATES PATENTS

| | | | |
|---|---|---|---|
| 3,002,462 | 10/1961 | Raymond | 102—1 X |
| 3,067,693 | 12/1962 | Lambeck | 103—1 X |
| 3,093,081 | 6/1963 | Budzich | 103—11 |
| 3,188,971 | 6/1965 | Puryear | 103—38 |
| 3,294,023 | 12/1966 | Martin-Vegue et al. | 103—11 |

WILLIAM L. FREEH, *Primary Examiner.*

U.S. Cl. X.R.
103—173, 4, 218